United States Patent [19]

Koyakumaru et al.

[11] Patent Number: 5,489,399
[45] Date of Patent: Feb. 6, 1996

[54] CARBON DIOXIDE GAS GENERATING COMPOSITIONS

[75] Inventors: Takatoshi Koyakumaru, Kyoto; Yoshinori Ono, Ibaraki, both of Japan

[73] Assignee: Rengo Co., Ltd., Osaka, Japan

[21] Appl. No.: 341,173

[22] Filed: Nov. 18, 1994

[30] Foreign Application Priority Data

Nov. 2, 1994 [JP] Japan .................................. 6-293786

[51] Int. Cl.$^6$ ...................................................... C07C 1/00
[52] U.S. Cl. ............................................. 252/373; 252/372
[58] Field of Search ...................................... 252/372, 373

[56] References Cited

U.S. PATENT DOCUMENTS 3,976,592  8/1976  Lacey et al. ............................. 252/373

FOREIGN PATENT DOCUMENTS 2123027  1/1984  United Kingdom ................... 252/373

*Primary Examiner*—Werren B. Lone
*Attorney, Agent, or Firm*—Nikaido, Marmelstein, Murray & Oram

[57] ABSTRACT

1. A carbon dioxide gas generating composition characterize in that:

(a) the composition comprises the combination of at least one component acid greater than carbonic acid in dissociation constant, at least 0.5 g/100 g water in solubility at 30° C. and solid (at least 40° C. in melting point) at room temperature and at least one component alkali carbonate up to 50 g/100 g water in solubility at 30° C., (b) at least one of the component acid and the component alkali carbonate of the combination is an acid having a solubility of up to 90 g/100 g water at 30° C. or an alkali carbonate having a solubility of up to 2 g/100 g water at 30° C., (c) the component acid is an acid or a salt convertible into an acid on decomposition, and the component alkali carbonate is an alkali metal carbonate or hydrogencarbonate, or alkaline earth metal carbonate, and, (d) the ratio of the component acid to the component alkali carbonate to be mixed therewith is 1:5 to 5:1 in equivalent ratio.

4 Claims, No Drawings

CARBON DIOXIDE GAS GENERATING COMPOSITIONS

BACKGROUND OF THE INVENTION

1. Field of the Invention

The present invention relates to carbon dioxide gas generating compositions which produce carbon dioxide gas with good stability in gas phases of widely varying relative humidities and which are suitable for use as agents for preserving the freshness of vegetables, fruits, etc.

2. Description of the Prior Art

Existing carbon dioxide gas generating compositions are used in baking powders, powders for use of refreshing beverage, artificial tooth cleaning agents, bathing agents, fire extinguishing agents or the like. These generating compositions are adapted to undergo a reaction within a short period of time, e.g., within several minutes, when heated or placed into water.

Especially for use in bathing agents which are used as admixed with a large quantity of water, the composition which is in the form of a mixture of acid and carbonate is prepared as granules or tablets so as to ensure effective contact between the acid and the carbonate. For this reason, the composition is prone to reaction during preservation, so that several proposals have been made to render such compositions preservable for a prolonged period of time.

These proposals include contact of the composition as shaped with carbon dioxide gas immediately before packaging to partly convert the carbonate into a hydrogencarbonate for the removal of free water (JP-A-141609/1986), addition of synthetic zeolite which has high ability to remove moisture (JP-B-9241/1989), use of tartaric acid only as the acid to be used and use of anhydrous sodiumcarbonate for taking up water as crystal water (JP-A-7246/1981), and use of anhydrous potassium carbonate in combination with the composition to afford improved preservability (JP-A-172810/1990).

However, the generating compositions of these proposals are not intended to produce carbon dioxide in a gas phase and fail to meet the conditions under which such compositions are to be used in a gas phase.

On the other hand, compositions ale proposed which are adapted to produce carbon dioxide in a gas phase by using an acid and further a hygroscopic substance in combination with a carbonate (JP-A-20270/1990). However, these proposed compositions start a reaction when the components are merely mixed together, therefore can not be stored as generating compositions and are inconvenient to handle because the components must be mixed together at the site of use.

Some compositions have also been proposed which are intended to produce carbon dioxide gas for a long period of time. These include one to be buried in soil for use as a fertilizer (JP-B-38524/1981), and a composition as absorbed by kieselguhr, which is further coated with gelatin to retard the reaction (JP-B-13367/1969).

The former evolves ammonia, is therefore difficult to use for foods, and is used under different conditions since it is used as a fertilizer as buried in earth. The latter generates little or no gas at a relative humidity of up to 80%, requires a cumbersome treatment and is not effectively usable.

It has been found that carbon dioxide of high concentration is extremely effective for preserving the freshness of vegetables, fruits and perishable foods, especially vegetables and fruits such as broccoli, ginggengcai and welsh onion. To provide an effective environment for preserving freshness of vegetables and fruits, it is desired to develop carbon dioxide generating compositions. In this case, compositions are desirable which generate carbon dioxide gas continuously over a distribution period or storage period in accordance with widely varying humidity conditions as involved in a gas phase of high humidity in the interior of a vegetable- or fruit-containing container wherein water vapor condensate is formed on the inside panel and a gas phase of low humidity wherein vegetables or fruits which awe less likely to release water vapor are present. Nevertheless, none of existing carbon dioxide gas generating compositions conform to these conditions and ensure high safety.

SUMMARY OF THE INVENTION

An object of the present invention is to develop a composition for reliably generating carbon dioxide gas continuously for at least several days in gas phases of widely varying relative humidities, the composition further being excellent in storage stability.

The above object is fulfilled by using as a carbon dioxide generating composition a material characterize in that:

(a) the composition comprises the combination of at least one component acid greater than carbonic acid in dissociation constant, at least 0.5 g/100 g water in solubility at 30° C. and solid (at least 40° C. in melting point) at room temperature and at least one component alkali carbonate up to 50 g/100 g water in solubility at 30° C., (b) at least one of the component acid and the component alkali carbonate of the combination is an acid having a solubility of up to 90 g/100 g water at 30° C. or an alkali carbonate having a solubility of up to 2 g/100 g water at 30° C., (c) the component acid is an acid or a salt convertible into an acid on decomposition, and the component alkali carbonate is an alkali metal carbonate or hydrogencarbonate, or alkaline earth metal carbonate, (d) the ratio of the component acid to the component alkali carbonate to be mixed therewith is 1:5 to 5:1 in equivalent ratio.

We have further found that addition of a component alkali carbonate and a component acid which are different in solubility provides a carbon dioxide gas generating composition which is adapted for use in a wider variety of environments, and also that addition of a hydrophobic material produces a similar effect.

DETAILED DESCRIPTION OF THE INVENTION

To overcome the foregoing problems and to provide more effective carbon dioxide gas generating compositions, we conducted intensive research and consequently found that for use in a gas phase having a relative humidity of not lower than 30%, liquid generating compositions underwent too rapid a reaction and were cumbersome to handle, and that the solid-solid combination of a solid component acid and a solid component alkali carbonate was required.

We also found that among solid-solid combinations for reaction, necessary were those which would not give a liquid reaction mixture.

We further found that for the decomposition of the component alkali carbonate to produce carbon dioxide gas, the solid component acid must have a dissociation constant at least greater than the dissociation constant of carbonic acid, $4.4 \times 10^{-7}$. When the component acid was smaller than carbonic acid in dissociation constant like boric acid, carbon dioxide hardly evolved.

Further research conducted on combinations of component acids and component alkali carbonates indicated that the combination of a highly soluble component acid and a highly soluble component alkali carbonate generated carbon dioxide gas rapidly and was not preservable satisfactorily and was cumbersome to handle since the composition itself became liquid.

Conversely, the combination of a component acid of low solubility and a component alkali carbonate of low solubility resulted in an insufficient reaction when used in a gas phase having a relative humidity of up to 80%.

However, such a combination is inexpensive, readily available and easy to handle.

Further research carried out has revealed that carbon dioxide gas is generated satisfactorily by the combination of a component alkali carbonate of low solubility and a component acid of high solubility, or by the combination of a component alkali carbonate of high solubility and a component acid of low solubility with or without a certain kind of additional component and/or a hydrophobic component added thereto.

Thus, suitable addition of such a certain kind of additional component and/or hydrophobic material provides a composition capable of reliably generating carbon dioxide gas continuously for at least several days in gas phases of widely varying relative humidities.

We have further conducted research to find that the presence of a component acid or component alkali carbonate as coated with a hydrophobic material to varying extents remarkably lengthens the carbon dioxide generating period. This finding has matured to a carbon dioxide gas generating composition which has a sufficiently prolonged generation period in environments of widely varying humidities.

More specifically, we have found that the preferred combination for continuously producing carbon dioxide gas in gas phases of widely varying relative humidities consists primarily of at least one component acid greater than carbonic acid in dissociation constant and at least 0.5 g/100 g water in solubility at 30° C. and at least one component alkali carbonate up to 50 g/100 g water in solubility at 30° C., at least one of the component acid and the component alkali carbonate being an acid having a solubility of up to 90 g/100 g water at 30° C. or an alkali carbonate having a solubility of up to 2 g/100 g water at 30° C.

We have found that outstanding storage stability is available especially when the component acid of the present invention is an acid which is up to 25 g/100 g water in solubility at 30° C., and that such an acid provides the most preferred combination.

The equivalent ratio of the component acid to the component alkali carbonate to be mixed therewith is 1:5 to 5:1, preferably 2:3 to 3:2. The composition then achieves a high generation efficiency, can be small in weight and is easy to handle. Conversely, if the equivalent ratio is outside the range of 1:5 to 5:1, the generating composition has an increased weight and is cumbersome to handle.

According to the present invention, it is preferable that the generating composition contain the component acid and the component alkali carbonate in a combined amount of at least 50 wt. %. If the amount is less than 50 wt. %, it is difficult to obtain the contemplated effect fully.

The component acid to be used in the present invention is a solid acid which is greater than carbonic acid in dissociation constant and at least 0.5 g/100 g water in solubility at 30° C., solid salt convertible into an acid on decomposition and having a solubility of at least 0.5 g/100 g water at 30° C. Examples of preferred acid components usable are solid acids not higher than 200 g/100 g water in solubility at 30° C. and convertible salts into an acid on decomposition. Examples of the acids are citric acid, tartaric acid, succinic acid, fumaric acid, maleic acid, adipic acid, malic acid, oxalic acid, malonic acid, glutaric acid, phthalic acid, metaphosphoric acid. Especially when a component acid having a solubility of up to 25 g/100 g water at 30° C. is used in combination with the above-specified component alkali carbonate to fulfill this requirement, a composition is obtained which has excellent storage stability and produces carbon dioxide gas with good stability since the composition does not give a liquid reaction mixture.

These examples are succinic acid, adipic acid and fumaric acid. Citric acid and malic acid are desirable in the case where the component alkali carbonate is up to 2 g/100 g water in solubility.

The salts convertible into an acid on decomposition are, for example, aluminum sulfate, calcium phosphate such as calcium primary phosphate, alum, etc. The salts include double salts, among which alums are suitable. Above all, anhydride of potash alum (burnt alum) comprising aluminum and potassium as metal ions is the longest in the duration of carbon dioxide generation and most suitable. Furthermore, the above-mentioned acids or alums are of the highest safety even if becoming incorporated in foods and are therefore most suitable for use in preserving the freshness of vegetables and fruits.

The component alkali carbonate to be used in the present invention is at least one of a carbonate of alkali metal, hydrogencarbonate of alkali metal and carbonate of alkaline earth metal. A wide variety of carbonates of these types are usable which are up to 50 g/100 g water in solubility at 30° C. More specific examples are lead carbonate, calcium carbonate, barium carbonate, strontium carbonate, magnesium carbonate, beryllium carbonate and tetrahydrate thereof, lithium carbonate, sodium carbonate and various hydrates thereof, sodium hydrogencarbonate, potassium hydrogencarbonate and the like.

Especially preferable are calcium carbonate, magnesium carbonate, sodium carbonate and sodium hydrogencarbonate.

Since the carbon dioxide gas generating composition of the present invention comprises the combination of a solid powder of component acid and a solid powder of component alkali carbonate, it is thought that the particle size of these powders will naturally affect the reaction. In the case where the component acid is up to 90 g/100 g water in solubility at 30° C. and the solid component alkali carbonate is up to 50 g/100 g water in solubility at 30° C., we have found that at least one of these components should be up to 2 mm in particle size. The particle size does not matter in the case of components having a high solubility.

The component acid and the component alkali carbonate to be used in the present invention each have the solubility described above. However, the two components having the respective specified solubilities are not always usable in combination, but the combination has the following restriction. Either one of the components must at least be a component acid having a solubility of up to 90 g/100 g water at 30° C. or a component alkali carbonate having a solubility of up to 2 g/100 g water at 30° C.

When another material is added to the composition of the invention, the composition exhibits an improved reaction efficiency even in a gas phase of low humidity to generate carbon dioxide gas with good stability. Materials useful for this purpose are as follows.

(i) Acids which are solid at room temperature and at least 130 g/100 g water in solubility at 30° C., salts thereof or salts having a solubility of at least 130 g/100 g water convertible to an acid on decomposition. Examples of such acids are citric acid, malonic acid, malic acid, tartaric acid and the like.

Examples of salts of solid acids are sodium salts or potassium salts of citric acid, maleic acid, malonic acid, malic acid and the like. These salts are normal salts or acidic salts.

Examples of such salts convertible into an acid on decomposition are sodium dihydrogenphosphate etc.

(ii) Alkali metal carbonates or hydrogencarbonates, having a solubility at 30° C. of higher than 10 g/100 g water to not higher than 130 g/100 g water. Examples of such carbonates are potassium carbonate, potassium hydrogencarbonate, sodium hydrogencarbonate, sodium carbonate and the like.

These carbonates are incorporated into the generating composition in an amount of 5–40 weight %. When these carbonates are used more than 40 wt. %, the present composition becomes liquid phase.

Further in order to make it possible to select the component acid and the component alkali carbonate from among a wide variety of combinations, a hydrophilic material can be used conjointly with the combination according to the invention. The material which is usable has a hygroscopicity of 80–250 wt. % based on the weight of the material itself at 30° C. and 95% RH for 24 hours. Examples of such materials saccharides or derivatives thereof, polyhydric alcohols or derivatives thereof, polyacrylamide or derivatives thereof, polyelectrolytes, water-absorbing polymers, etc.

The hygroscopic material is used in an amount of 5 to 40 wt. % based on the generating composition.

Materials, such as calcium chloride, having a hygroscopicity of more than 250 wt. % are not usable since the presence of the material results in impaired storage stability.

Examples of saccharides are not only monosaccharides, oligosaccharides and polysaccharides but also derivatives of such saccharides. More specific examples of monosaccharides are erythrose, threose, arabinose, xylose, lyxose, glucose, fructose, mannose, galactose and the like, and examples of derivatives thereof are sorbitol, gluconic acid, etc.

Examples of oligosaccharides are sucrose, lactose, maltose and the like. Examples of polysaccharides are dextrin, amylose, amylopectine, cellulose and the like, and examples of derivatives thereof are hydroxyethyl cellulose, carboxymethyl cellulose, carbamoyl cellulose, pullulan, curdlan, isomerized sugar, starch oxide, etc.

Examples of polyhydric alcohols are glycerin, ethylene glycol, diethylene glycol, polyethylene glycol, polyvinyl alcohol, derivatives thereof, etc. Further usable are hydrophilic polymers such as polyacrylamide.

Examples of polyelectrolytes are polystyrenesulfonic acid salts, sodium polyacrylate, etc.

Usable as water-absorbing polymers are usual water-absorbing polymers such as starch, cellulose and polyacrylic acids which are chemical modified and crosslinked.

Hydrophobic materials are also usable in the present invention from the viewpoint of facilitating adjustment of the amount of carbon dioxide gas to be generated, especially to facilitate the adjustment in conformity with the humidity of the atmosphere in which the composition is used. Examples of useful hydrophobic materials are waxes, saturated or unsaturated fatty acids, salts of these fatty acids and esters of these fatty acids. Examples of waxes are carbon wax, polyethylene wax and like synthetic waxes, montan wax, ozocerite and like mineral waxes, paraffin wax, mocrocrystalline wax and like petroleum waxes, beeswax, insect wax, spermaceti wax, wool wax and like animal waxes, and carnauba wax, Japan wax, sugar cane wax and like plant waxes.

The saturated or unsaturated fatty acids to be used include various acids having about 6 to about 22 carbon atoms. Examples of such acids are caproic acid, caprylic acid, captic acid, lauric acid, myristic acid, palmitic acid, stearic acid, behenic acid and like saturated fatty acids, and oleic acid, linolenic acid, linoleic acid, erucic acid and like unsaturated fatty acids.

Examples of salts of such fatty acids are zinc laurate, sodium palmitate, aluminum stearate, magnesium stearate and the like. Typical examples of esters thereof are alkyl esters having about 1 to about 17 carbon atoms and glycerin esters.

Preferable among these hydrophobic materials are those which are solid at room temperature. Especially when wax, beeswax, fatty acid or fatty acid salt is used for coating the surface of the component alkali carbonate, or the component acid, the coated component carbonate or the coated component acid is easy to handle. Further when lauric acid, palmitic acid, stearic acid, behenic acid or like fatty acid is used for coating the surface of particles of calcium carbonate or magnesium carbonate, the acid readily combines with calcium or magnesium on the particle surfaces, so that the coating can be formed with ease, will not separate off readily and is effective. In the case where other hydrophobic material is used for coating, use of the fatty acid in combination therewith is effective for facilitated coating.

When used in an amount of not smaller than 0.1 wt. % to not greater than 40 wt. % based on the generating composition, these hydrophobic materials are highly effective for controlling the duration of carbon dioxide generation. When greater than 40 wt. %, the generating composition hardly generates carbon dioxide gas. Especially when the surface of the component alkali carbonate is coated with hydrophobic material, the presence of the hydrophobic material produces a very remarkable effect. In the case where coated components which are different in the degree of coating with the hydrophobic material are used in combination, the resulting composition is capable of producing gas continuously in gas phases of more widely varying relative humidities.

In using the component acid, component alkali carbonate, hydrophilic material and hydrophobic material, the compounds or materials exemplified for each of these components are usable singly or in combination as suitable selected.

Hydrates of the main components, i.e., component alkali carbonate and component acid having crystal water therein, such as sodium carbonate monohydrate and citric acid mono- or poly-hydrate are effective for increasing the water content of the generating composition and therefore ensuring a promoted reaction for generating the gas with higher stability in a low-humidity environment.

For use with vegetables, fruits and perishable foods, especially with fruits and vegetables for preserving freshness of them, generating compositions need to produce carbon dioxide gas continuously over a distribution period or storage period in accordance with a widely varying humidity conditions ranging from the high humidity of a gas phase as in containers wherein fruit or vegetables are accommodated permitting condensation of water vapor on the inside panel, to the relatively low humidity of a gas phase wherein such fruit or vegetables as are smaller in the amount of release of water vapor are present. The present invention provides carbon dioxide gas generating compositions which are selectively usable in conformity with a widely varying humidity conditions for producing the gas in a gas phase with good stability and are therefore very suitable also as agents for preserving the freshness of fruits and vegetables.

When to be used for this purpose, the carbon dioxide gas generating composition of the invention is usually packed into a bag made of nonwoven fabric, woven fabric, film formed with fine pores not passing a liquid therethrough or composite sheet of such materials and placing the bag along with fruit or vegetables into a closed or loose sealed packaging of plastics, expanded plastics or composite material of plastics. In this application. It is important a suitable oxygen concentration is maintained in these packaging. And then carbon dioxide gas generating composition of the invention can be used with oxygen generating agent or ethylene removing agent.

The present composition is of course usable for applications other than the above. For example for use as an agent for supplying carbon dioxide gas for horticulture, the composition is effective for supplementing usual greenhouses or plastic greenhouses with carbon dioxide for protected cultivation to assure sound growth of crop plants. The generating composition of the invention is further of high safety and useful.

For a better understanding of the present invention, the invention will be described below in greater detail with reference to some experimental examples.

The present invention provides a generating composition which is exceedingly high in storage stability before use and which produces carbon dioxide gas with good stability in environments of high to relatively low humidities since the reaction mixture does not become liquid. The composition is very useful also as an agent for preserving freshness of fruits and vegetables.

EXPERIMENTAL EXAMPLE

Listed below are the solubilities and decomposition temperatures of the main component alkali carbonates and component acids to be used in the following experimental examples. In these experimental examples "component carbonate" shows "component alkali carbonate".

| Chemical | Solubility (g/100 g water, 30° C.) | Decomposition temperature (°C.) |
|---|---|---|
| Potassium sodium carbonate hexahydrate $KNaCO_3 \cdot 6H_2O$ | 200 | 100 |
| Potassium carbonate ($K_2CO_3$) | 121 | 891 |
| Sodium carbonate monohydrate ($Na_2CO_3 \cdot H_2O$) | 45 | 100 |
| Sodium carbonate ($Na_2CO_3$) | 25 | 851 |
| Sodium hydrogencarbonate ($NaHCO_3$) | 12 | 270 |
| Lithium carbonate ($Li_2CO_3$) | 1.25 | 618 |
| Calcium carbonate ($CaCO_3$) | 0.0015 | 900 |
| Magnesium carbonate ($MgCO_3$) | 0.011 | 600 |
| Tartaric acid | 156 | 168 |
| Oxalic acid | 14 | 186 |
| Boric acid | 9 | 185 |
| Citric acid | 183 | 175 |
| Malic acid | 155 | 131 |
| Malonic acid | 154 | 135 |
| Maleic acid | 88 | 135 |
| Potassium aluminum sulfate (Burnt alum) | 15 | 93 |
| Succinic acid | 11 | 235 |
| Fumaric acid | 0.8 | 286 |
| Phthalic acid | 0.6 | 231 |
| Benzoic acid | 0.4 | 122 |
| Sodium 2-hydrogen phosphate | 179 | 204 |
| Potassium citrate | 198 | 230 |
| Sodium maleate half hydrate | 140 | 100 |
| Potassium tartarate | 200 | 200 |
| Sodium fumarate | 29 | Atleast300 |

Experimental Example 1

The carbon dioxide gas generating compositions listed in Table 1-1 below were placed in an environment having a temperature of 30° C. and relative humidity of 80%, and checked for reaction efficiency and state with time. These compositions were each prepared by mixing together a component carbonate and a component acid in a weight ratio of 40 parts:60 parts with stirring. Table 1-1 shows the results.

Also the above compositions were places in an environment having a temperature of 30° C. and relative humidity of 95% (Table 1-2) and environment having a temperature of 20° C. and relative humidity of 65% (Table 1-3). The results are shown in Table 1-2 and Table 1-3.

TABLE 1-1

| Composition | | | Generation efficiency on lapse of time (%) | | | | State of composition | |
|---|---|---|---|---|---|---|---|---|
| Component carbonate | Component acid | Equivalent ratio | 24h | 48h | 72h | 120h | 120h later | Note |
| Potassium | Tartaric acid | 1:1.4 | 100 | 100 | 100 | 100 | Liquid | Comp. Ex. |
| carbonate | Fumaric acid | 1:1.7 | 100 | 100 | 100 | 100 | Liquid | Comp. Ex. |
| Sodium | Maleic acid | 1:1.5 | 70 | 90 | 95 | 100 | Solid | Invention |
| carbonate | Fumaric acid | 1:1.5 | 80 | 90 | 100 | 100 | Solid | Invention |
| monohydrate | Boric acid | 1:3.6 | 0 | 0 | 0 | 0 | Solid | Comp. Ex. |
| Sodium | Tartaric acid | 1:1.1 | 100 | 100 | 100 | 100 | Liquid | Comp. Ex. |
| carbonate | Maleic acid | 1:1.3 | 15 | 65 | 75 | 85 | Solid | Invention |
|  | Fumaric acid | 1:1.3 | 20 | 70 | 80 | 90 | Solid | Invention |
| Sodium | Citric acid | 1:1.8 | 100 | 100 | 100 | 100 | Liquid | Comp. Ex. |
| hydrogen- | Maleic acid | 1:2 | 20 | 55 | 70 | 80 | Solid | Invention |
| carbonate | Fumaric acid | 1:2 | 15 | 30 | 45 | 60 | Solid | Invention |
|  | Benzoic acid | 1:1 | 0 | 0 | 0 | 0 | Solid | Invention |
| Lithium | Citric acid | 1.3:1 | 85 | 95 | 60 | 100 | Solid | Comp. Ex. |
| carbonate | Maleic acid | 1.1:1 | 10 | 60 | 70 | 80 | Solid | Invention |
|  | Fumaric acid | 1.1:1 | 20 | 60 | 80 | 85 | Solid | Invention |
| Calcium | Citric acid | 1:1.1 | 50 | 55 | 60 | 60 | Solid | Invention |
| carbonate | Maleic acid | 1:1.2 | 20 | 50 | 60 | 65 | Solid | Invention |
|  | Burnt alum | 1.1:1 | 20 | 30 | 35 | 40 | Solid | Invention |

TABLE 1-2

| Composition | | | Generation efficiency on lapse of time (%) | | | | State of composition | |
|---|---|---|---|---|---|---|---|---|
| Component carbonate | Component acid | Equivalent ratio | 6h | 24h | 48h | 72h | 72h later | Note |
| Potassium carbonate | Fumaric acid | 1:1.7 | 100 | 100 | 100 | 100 | Liquid | Comp. Ex. |
| Sodium | Maleic acid | 1:1.3 | 10 | 50 | 80 | 90 | Solid | Invention |
| carbonate | Fumaric acid | 1:1.3 | 30 | 60 | 85 | 95 | Solid | Invention |
| Sodium | Citric acid | 1:1.8 | 100 | 100 | 100 | 100 | Liquid | Comp. Ex. |
| hydrogen- | Maleic acid | 1:2 | 15 | 60 | 80 | 90 | Solid | Invention |
| carbonate | Fumaric acid | 1:2 | 50 | 80 | 90 | 95 | Solid | Invention |
| Calcium | Citric acid | 1:1.1 | 50 | 85 | 90 | 95 | Solid | Invention |
| carbonate | Maleic acid | 1:1.2 | 20 | 60 | 75 | 85 | Solid | Invention |
|  | Fumaric acid | 1.1:2 | 30 | 50 | 55 | 60 | Solid | Invention |

TABLE 1-3

| Composition | | | Generation efficiency on lapse of time (%) | | | | State of composition | |
|---|---|---|---|---|---|---|---|---|
| Component carbonate | Component acid | Equivalent ratio | 24h | 48h | 35h | 40h | 120h later | Note |
| Sodium carbonate | Maleic acid | 1:1.3 | 5 | 30 | 35 | 40 | Solid | Invention |
| Sodium hydrogen- carbonate | Maleic acid | 1:2 | 5 | 10 | 15 | 20 | Solid | Invention |
| Calcium carbonate | Citric acid | 1:1.1 | 5 | 10 | 15 | 25 | Solid | Invention |

Experimental Example 2

The carbon dioxide gas generating compositions listed in Table 2 below were placed in an environment having a temperature of 30° C. and relative humidity of 80%, and checked for reaction efficiency with time. These compositions were each prepared from specified amounts of sodium hydrogencarbonate and fumaric acid by mixing the components together with stirring. Table 2 shows the results. The generating efficiency is calculated the amount of gas produced based on the amount which sodium hydrogencarbonate is reacted as 100%.

TABLE 2

| Equivalent ratio | | Weight ratio | | Generation efficiency on lapse of time (%) | | | | State of | |
|---|---|---|---|---|---|---|---|---|---|
| Sodium hydrogen-carbonate | Fumaric acid | Sodium hydrogen-carbonate | Fumaric acid | 24h | 48h | 72h | 120h | composition | Note |
| 1 | 8 | 15.3 | 84.7 | 100 | 100 | 100 | 100 | ○ | Comp. Ex. |
| 1 | 5 | 22.5 | 77.5 | 70 | 90 | 100 | 100 | ○ | Invention |
| 2 | 3 | 49.1 | 50.9 | 15 | 30 | 45 | 60 | ○ | Invention |
| 1 | 1 | 59.2 | 40.8 | 10 | 25 | 40 | 55 | ○ | Invention |
| 3 | 2 | 68.5 | 31.5 | 10 | 20 | 35 | 45 | ○ | Invention |
| 5 | 1 | 87.9 | 12.1 | 5 | 10 | 15 | 15 | ○ | Invention |
| 8 | 1 | 92.1 | 7.9 | 5 | 5 | 5 | 5 | ○ | Comp. ex. |

The state of the composition given in Table 2 was evaluated according to the following criteria.

o: Remained solid after reaction.
Δ: Remained solid after reaction although hygroscopic.
×: The reaction mixture turned liquid.

Experimental Example 3

The carbon dioxide gas generating compositions listed in Tables 3 and 4 below were placed in an environment having a temperature of 30° C. and relative humidity of 80%:, and checked for reaction efficiency with time. These compositions were each prepared by mixing together specified components in specified amounts with stirring. Tables 3 and 4 show the results.

TABLE 3-1

| Composition (Weight ratio) | | | Equivalent ratio (A):(B) | Generation efficiency on lapse of time (%) | | | | State of composition | Note |
|---|---|---|---|---|---|---|---|---|---|
| (A) Component carbonate | (B) Component acid | Other component | | 24h | 48h | 72h | 120h | | |
| Sodium carbonate | Fumaric acid | Citric acid | | | | | | | |
| 37.9 | 62.1 | 0.0 | 1:1.5 | 20 | 70 | 80 | 90 | ○ | *1 |
| 37.3 | 53.9 | 8.8 | 1:1.3 | 30 | 80 | 90 | 95 | ○ | *1 |
| 36.5 | 41.9 | 21.6 | 1:1 | 60 | 85 | 95 | 100 | ○ | *1 |
| 36.4 | 25.7 | 37.9 | 1.7:1 | 80 | 95 | 100 | 100 | Δ | *1 |
| 35.6 | 20.5 | 43.9 | 2:1 | 100 | 100 | 100 | 100 | × | *2 |
| Sodium hydrogencarbonate | Fumaric acid | Citric acid | | | | | | | |
| 48.6 | 45.3 | 6.1 | 1:1.3 | 55 | 65 | 75 | 85 | ○ | *1 |
| 47.6 | 34.5 | 17.9 | 1:1 | 70 | 80 | 90 | 95 | ○ | *1 |
| | | Malonic acid | | | | | | | |
| 49.9 | 36.2 | 13.9 | 1:1 | 80 | 90 | 100 | 100 | ○ | *1 |

(Note)
*1: Invention
*2: Comp. Ex.

TABLE 3-2

| Composition (Weight ratio) | | | Equivalent ratio (A):(B) | Generation efficiency on lapse of time (%) | | | | State of composition | Note |
|---|---|---|---|---|---|---|---|---|---|
| (A) Component carbonate | (B) Component acid | Other component | | 24h | 48h | 72h | 120h | | |
| Sodium carbonate | Fumaric acid | Malonic acid | | | | | | | |
| 38.7 | 44.3 | 17.0 | 1:1 | 80 | 95 | 100 | 100 | ○ | *1 |
| | | Malic acid | | | | | | | |
| 36.8 | 42.2 | 21.0 | 1:1 | 60 | 85 | 95 | 100 | ○ | *1 |
| Sodium hydrogencarbonate | Fumaric Acid | | | | | | | | |
| | | Potassium citrate | | | | | | | |

TABLE 3-2-continued

| Composition (Weight ratio) | | | Equivalent ratio | Generation efficiency on lapse of time (%) | | | | State of | |
|---|---|---|---|---|---|---|---|---|---|
| (A) Component carbonate | (B) Component acid | Other component | (A):(B) | 24h | 48h | 72h | 120h | composition | Note |
| 32.1 Sodium carbonate | 47.5 Fumaric acid | 20.4 Sodium maleate | 1:2.2 | 60 | 70 | 75 | 80 | ○ | *1 |
| 19.1 | 59.9 | 21.0 | 1:2.9 | 70 | 80 | 90 | 95 | ○ | *1 |

(Note)
*1: Invention
*2: Comp. Ex.

TABLE 4

| Composition (Weight ratio) | | | Equivalent ratio | Generation efficiency on lapse of time (%) | | | | State of | |
|---|---|---|---|---|---|---|---|---|---|
| (A) Component carbonate | (B) Component acid | Other component | (A):(B) | 24h | 48h | 72h | 120h | composition | Note |
| Sodium carbonate 25.5 | Fumaric acid 59.0 | Isomerized sugar 15.5 Sodium polyacrylate | 1:2.1 | 60 | 80 | 95 | 100 | ○ | *1 |
| 27.4 | 64.1 | 8.5 Polyacrylamide | 1:2.1 | 40 | 70 | 85 | 95 | ○ | *1 |
| 15.5 Sodium carbonate | 49.4 Maleic acid | 35.1 Starch Sodium polyacrylate | 1:2.9 | 50 | 70 | 80 | 85 | ○ | *1 |
| 19.1 Sodium carbonate | 59.0 Maleic acid | 21.9 Glycerin | 1:2.8 | 60 | 70 | 75 | 80 | ○ | *1 |
| 32.3 | 57.7 | 10.0 | 1:1.6 | 70 | 85 | 95 | 100 | ○ | *1 |

(Note)
*1: Invention

The state of the compositions in Table 3 was evaluated according to the same criteria as in Table 2.

The state of the compositions in Table 4 was evaluated according to the same criteria as in Table 2.

Experimental Example 4

The carbon dioxide gas generating compositions shown in Table 5 below and prepared in the same manner as in experimental Example 3 were placed in an environment having a temperature of 30° C. and relative humidity of 80% and checked for reaction efficiency with time. Table 5 also shows the results.

TABLE 5

| Composition (Weight ratio) | | | Generation efficiency on lapse of time (%) | | | | State of composition | Note |
|---|---|---|---|---|---|---|---|---|
| Component carbonate | Component acid | Other component | 24h | 48h | 72h | 120h | | |
| Sodium carbonate 21.7 | Fumaric acid 59.4 | Polyethylene 18.9 | 35 | 45 | 55 | 60 | ○ | *1 |
| 17.9 | 58.8 | 23.3 | 40 | 50 | 60 | 70 | ○ | *1 |
| Sodium hydrogencarbonate 47.6 | Fumaric acid 34.5 | Citric acid 17.9 | 25 | 35 | 45 | 55 | ○ | *1 |
| 35.4 | 52.2 | Isomerized sugar 12.4 | 30 | 40 | 50 | 60 | ○ | *1 |
| Calcium carbonate 32.3 | Citric acid 67.7 | — | 20 | 20 | 20 | 20 | ○ | *1 |

(Note)
*1: Invention

The state of the compositions in Table 5 was evaluated according to the same criteria as in Table 2.

Experimental Example 5

The carbon dioxide gas generating compositions shown in Table 6 below and prepared in the same manner as in experimental Example 3 were placed in an environment having a temperature of 30° C. and relative humidity of 80% and checked for reaction efficiency with time. Table 6 also shows the results.

TABLE 6

| Composition (Weight ratio) | | | | (A) Other component | | Total amount of (A) | Generation efficiency on lapse of time (%) | | | | State of composition | Note |
|---|---|---|---|---|---|---|---|---|---|---|---|---|
| Component carbonate | | Component acid | | | | | 24h | 48h | 72h | 120h | | |
| Sodium hydrogen-carbonate | Sodium carbonate | Fumaric acid | Maleic acid | | | | | | | | | |
| 36.4 (0.7) | 9.8 (0.3) | 53.8 (1.5) | — | — | — | — | 20 | 50 | 65 | 75 | ○ | *1 |
| 47.6 (1) | — | 34.5 (1) | 17.9 (0.5) | — | — | — | 20 | 45 | 60 | 70 | ○ | *1 |
| 30.6 (0.5) | 18.0 (0.5) | 45.3 (1.1) | — | Citric acid 6.1 | — | 6.1 | 60 | 70 | 75 | 80 | ○ | *1 |
| 35.4 (1) | — | 50.2 (2.1) | — | Sodium citrate 10.4 | Polyacryl-amide 4.0 | 14.4 | 50 | 80 | 95 | 100 | ○ | *1 |
| — | 17.9 (1) | — | 58.8 (3.0) | Sodium Maleate 11.3 | Isomerized sugar 12.0 | 23.3 | 40 | 60 | 70 | 80 | ○ | *1 |

Note
*1: Invention

The state of the compositions in Table 6 was evaluated according to the same criteria as in Table 2. The value in the parentheses is an equivalent ratio.

Experimental Example 6

Carbon dioxide gas generating compositions were prepared each by adding 30 wt. %, based on the composition, of the hydrophilic material listed in Table 7 below to a mixture of sodium hydrogencarbonate and fumaric acid in an equivalent ratio of 1:1. The compositions were placed in an environment having a temperature of 30° C. and relative humidity of 80%, and checked for reaction efficiency with time. Table 7 also shows the results.

Experimental Example 7

The carbon dioxide gas generating compositions listed in Table 8 below were placed in an environment having a temperature of 30° C. and relative humidity of 80%, arid checked for reaction efficiency with time. These compositions were each prepared by mixing together specified amounts of specified components by stirring. Table 8 also shows the results.

TABLE 7

| Weight ratio | | | Generation efficiency on lapse of time (%) | | | | State of composition | Note |
|---|---|---|---|---|---|---|---|---|
| (A) Component carbonate | (B) Component acid | Other component | 24h | 48h | 72h | 120h | | |
| Sodium hydrogencarbonate 59.1 | Fumaric acid 40.9 | — | 10 | 25 | 40 | 55 | O | *1 |
| 41.4 | 28.6 | Sodium fumarate 30.0 | 15 | 25 | 40 | 55 | O | *1 |
| 41.4 | 30.0 | Sodium citrate 30.0 | 55 | 70 | 80 | 90 | O | *1 |

(Note)
*1: Invention

The state of the compositions in Table 7 was evaluated according to the same criteria as in Table 2.

TABLE 8

| (Weight ratio) | | | Equivalent ratio | Generation efficiency on lapse of time (%) | | | | State of composition | Note |
|---|---|---|---|---|---|---|---|---|---|
| (A) Component carbonate | (B) Component acid | Other component | (A):(B) | 24h | 48h | 72h | 120h | | |
| Calcium carbonate | Fumaric acid | Potassium carbonate | | | | | | | |
| 39.6 | 53.7 | 6.7 | 1:1.2 | 30 | 40 | 50 | 55 | O | *1 |
| 24.1 | 53.7 | 22.2 | 1:1.9 | 45 | 60 | 70 | 80 | O | *1 |
| 20.1 | 43.3 | 36.6 | 1:1.9 | 65 | 75 | 85 | 100 | O | *1 |
| 19.9 | 20.0 | 60.1 Sodium carbonate | 1.2:1 | 100 | 100 | 100 | 100 | X | *2 |
| 23.8 | 53.7 | 22.5 | 1:2.1 | 60 | 70 | 75 | 80 | O | *1 |
| Magnesium carbonate | Fumaric acid | Potassium carbonate | | | | | | | |
| 36.0 | 58.0 | 6.0 | 1:1.2 | 50 | 60 | 65 | 70 | O | *1 |
| 21.8 | 58.0 | 20.2 | 1:1.9 | 60 | 70 | 80 | 90 | O | *1 |
| 21.4 | 42.6 | 36.0 | 1:1.4 | 75 | 85 | 90 | 100 | O | *1 |
| 15.4 | 26.4 | 58.2 | 1:1.2 | 100 | 100 | 100 | 100 | X | *2 |
| 22.9 | 58.0 | *3 19.1 *4 | 1:1.8 | 50 | 60 | 70 | 75 | O | *1 |
| 21.8 | 58.0 | 20.2 | 1:1.9 | 100 | 100 | 100 | 100 | X | *2 |

(Note)
*1: Invention
*2: Comp. Ex.
*3: Sodium hydrogencarbonate
*4: Potassium sodium carbonate hexahydrate The state of the compositions in Table 8 was evaluated according to the same criteria as in Table 2.

Experimental Example 8

The carbon dioxide gas generating compositions listed in Table 9 below were placed in an environment having a temperature of 30° C. and relative humidity of 80%, and checked for reaction efficiency with time. These compositions were prepared from a component carbonate and a component acid in a weight ratio of 50 parts:50 parts, and 40 parts of potassium carbonate when this compound was additionally used, by mixing together these components with stirring. Table 9 also shows the results.

TABLE 9

| Composition | | Equivalent ratio | Generation efficiency on lapse of time (%) | | | | State of composition | Note |
|---|---|---|---|---|---|---|---|---|
| (A) Component carbonate | (B) Component acid | (A):(B) | 24h | 48h | 72h | 120h | | |
| Sodium carbonate +Potassium carbonate | Fumaric acid | 1:1.4 | 100 | 100 | 100 | 100 | Liquid | *2 |
| Calcium carbonate +Potassium carbonate | Maleic acid | 1:1.4 | 70 | 80 | 90 | 95 | Solid | *1 |
| | Fumaric acid | 1:1.4 | 60 | 70 | 80 | 90 | Solid | *1 |
| Calcium carbonate | Maleic acid | 1.2:1 | 20 | 50 | 60 | 65 | Solid | *1 |

(Note)
*1: Invention
*2: Comp. Ex.

Experimental Example 9

The carbon dioxide gas generating compositions listed in Tables 10, 11 and 12 below were placed in an environment having a temperature of 30° C. and relative humidity of 80%, and checked for reaction efficiency with time. These compositions were each prepared by mixing together specified amounts of specified components by stirring. The results are shown also in Tables 10, 11 and 12. The value in the parentheses in Table 12 is an equivalent ratio.

TABLE 10-1

| (Weight ratio) | | | | Total amount of (C) | Equivalent ratio (A):(B) | Generation efficiency on lapse of time (%) | | | | State of Composition | Note |
|---|---|---|---|---|---|---|---|---|---|---|---|
| (A) Component carbonate | (B) Component acid | (C) Other component | | | | 24h | 48h | 72h | 120h | | |
| Calcium carbonate | Fumaric acid | Sodium carbonate | Citric acid | | | | | | | | |
| 31.0 | 53.9 | 5.5 | 9.6 | 15.1 | 1:1.5 | 30 | 40 | 50 | 60 | ○ | *1 |
| 24.8 | 47.4 | 11.7 | 12.9 | 24.6 | 1:1.6 | 50 | 60 | 70 | 80 | ○ | *1 |
| 28.3 | 32.8 | 23.1 | 15.8 | 38.9 | 1:1 | 75 | 85 | 90 | 100 | ○ | *1 |
| 18.5 | 21.5 | 27.8 | 32.2 | 60.0 | 1:1 | 100 | 100 | 100 | 100 | X | *2 |
| Calcium carbonate | Fumaric acid | Sodium hydrogen-carbonate | Citric acid | | | | | | | | |
| 37.0 | 43.0 | 9.3 | 10.7 | 20.0 | 1:1 | 30 | 45 | 55 | 65 | ○ | *1 |
| 30.0 | 33.8 | 16.3 | 19.9 | 36.2 | 1:1 | 60 | 70 | 80 | 90 | ○ | *1 |

Note
*1: Invention
*2: Comp. Ex.

TABLE 10-2

| (Weight ratio) | | | | Total amount of (C) | Equivalent ratio (A):(B) | Generation efficiency on lapse of time (%) | | | | State of Composition | Note |
|---|---|---|---|---|---|---|---|---|---|---|---|
| (A) Component carbonate | (B) Component acid | (C) Other component | | | | 24h | 48h | 72h | 120h | | |
| Calcium carbonate | Fumaric acid | Sodium hydrogen-carbonate | Malonic acid | | | | | | | | |
| 32.4 | 37.6 Maleic acid | 13.9 Sodium carbonate | 16.1 | 30.0 | 1:1 | 70 | 80 | 90 | 100 | ○ | *1 |
| 25.6 | 44.5 | 10.9 | 19.0 Malic acid | 29.9 | 1:1.5 | 65 | 75 | 85 | 90 | ○ | *1 |
| 27.4 | 47.6 | 9.1 Potassium tartalate | 15.9 | 25.0 | 1:1.5 | 60 | 80 | 90 | 95 | ○ | *1 |
| 33.4 | 46.2 | 20.4 Sodium maleate | — | 20.4 | 1:1 | 55 | 65 | 70 | 75 | ○ | *1 |
| 35.9 | 43.1 | 21.0 | — | 21.0 | 1:1 | 60 | 70 | 80 | 85 | ○ | *1 |

Note
*1: Invention

TABLE 11

| (Weight ratio) | | | Equivalent ratio (A):(B) | Generation efficiency on lapse of time (%) | | | | State of composition | Note |
|---|---|---|---|---|---|---|---|---|---|
| (A) Component carbonate | (B) Component acid | Other component | | 24h | 48h | 72h | 120h | | |
| Calcium carbonate | Fumaric acid | Isomerized sugar | | | | | | | |
| 38.4 | 46.1 | 15.5 Sodium polyacrylate | 1.1:1 | 50 | 65 | 80 | 90 | ○ | *1 |
| 41.6 | 49.9 | 8.5 Polyacrylamide | 1.2:1 | 30 | 50 | 60 | 70 | ○ | *1 |
| 29.5 Calcium carbonate | 35.4 Maleic acid | 35.1 Sodium polyacrylate | 1.2:1 | 40 | 50 | 60 | 70 | ○ | *1 |
| 35.5 | 42.6 | 21.9 Glycerin | 1:1 | 50 | 60 | 65 | 70 | ○ | *1 |
| 41.0 | 49.0 | 10.0 | 1:1 | 50 | 65 | 75 | 80 | ○ | *1 |

(Note)
*1: Invention

TABLE 12

| (Weight ratio) | | | | Total amount of (1) | Generation efficiency on lapse of time (%) | | | | Evaluation |
|---|---|---|---|---|---|---|---|---|---|
| Component carbonate | Component acid | | (1) Other component | | 24h | 48h | 72h | 120h | |
| A | B | C | D | | | | | | |
| 36.4(1) | 26.9(0.6) | 26.9(0.6) | 9.8 — | 9.8 | 30 | 50 | 65 | 75 | ○ |
| 37.6(1) | 32.4(0.8) | 10.0(0.2) | 20.0 — | 20.0 | 50 | 60 | 70 | 80 | ○ |
| | | | E  F | | | | | | |
| 35.0(1.4) | 30.0(1) | | 10.0  10.0 | 20.0 | 75 | 90 | 95 | 100 | ○ |
| G | | | | | | | | | |
| 30.2(0.8) 6.3(0.2) | 54.4(1.2) | — | 9.1 — | 9.1 | 70 | 80 | 90 | 100 | ○ |
| | | | H | | | | | | |
| 31.5(1) | — | 52.7(1.4) | 5.4  10.4 | 15.8 | 50 | 65 | 80 | 90 | ○ |
| G | | C | I  J | | | | | | |
| 30.5(1) | — | — | 45.0(1.1) 11.5  13.0 | 24.5 | 50 | 60 | 70 | 75 | ○ |

TABLE 12-continued

| (Weight ratio) | | | | Generation efficiency on lapse of time (%) | | | | |
|---|---|---|---|---|---|---|---|---|
| Component carbonate | Component acid | (1) Other component | Total amount of (1) | 24h | 48h | 72h | 120h | Evaluation |

Note
A: Calcium carbonate
B: Fumaric acid
C: Maleic acid
D: Sodium carbonate
E: Glycerin
F: Potassium carbonate
G: Magnesium carbonate
H: Sodium citrate
I: Sodium maleate
J: Isomerized sugar The state of the compositions in Table 10 was evaluated according to the same criteria as in Table 2.

The state of the compositions in table 11 was evaluated according to the same criteria as in Table 2.

The state of the compositions in table 12 was evaluated according to the same criteria as in Table 2.

Experimental Example 10

The carbon dioxide gas generating compositions listed in Table 13 below and prepared in the same manner as in Experimental Example 9 placed in an environment having a temperature of 30° C. and relative humidity of 30%, and checked for reaction efficiency with time. Table 13 also shows the results. The value in the parentheses in Table 13 is an equivalent ratio.

Experimental Example 11

The carbon dioxide gas generating compositions listed in Tables 14 and 15 below were placed in an environment having a temperature of 30° C. and relative humidity of 95%, and checked for the duration of gas generation. These compositions were each prepared from specified amounts of specified components by mixing together the components with stirring. Tables 14 and 15 also show the results.

TABLE 13

| (Weight ratio) | | | | Generation efficiency on lapse of time (%) | | | | State of | |
|---|---|---|---|---|---|---|---|---|---|
| Component carbonate | Component acid | (1) Other component | | Total amount of (1) | 24h | 48h | 72h | 120h | composition | Note |
| Calcium carbonate 24.9(1) | Fumaric acid 47.9(1.7) | Sodium carbonate 14.8 | Citric acid 12.4 | 27.2 | 30 | 40 | 50 | 55 | ○ | *1 |
| Calcium carbonate 30.3(1) | Fumaric acid 33.9(1) | Sodium hydrogen-carbonate 16.0 | Citric acid 19.8 | 35.8 | 30 | 45 | 55 | 65 | ○ | *1 |
| Calcium carbonate 32.9(1) | Fumaric acid 37.1(1) | Malonic acid 13.4 | Citric acid 16.6 | 30.0 | 50 | 60 | 65 | 75 | ○ | *1 |
| Magnesium carbonate 21.2(1) | Maleic acid 58.0(2) | Potassium carbonate 20.8 | — | 20.8 | 55 | 65 | 75 | 90 | ○ | *1 |
| Magnesium carbonate 20.0 (1) | Maleic acid 41.0(1.5) | Malic acid 18.2 | citric acid 20.8 | 39.0 | 40 | 50 | 60 | 65 | ○ | *1 |

Note
*1: Invention

The state of the compositions in table 13 was evaluated according to the same criteria as in Table 2.

TABLE 14

| (Weight ratio) | | | Generation efficiency on lapse of time (%) | | | | |
|---|---|---|---|---|---|---|---|
| Component carbonate | Component acid | Hydrophobic material | 24h | 48h | 72h | 96h | 120h |
| Calcium carbonate | Citric acid | Stearic acid | | | | | |
| 32.3 | 67.7 | 0 | 90 | 90 | 90 | 90 | 90 |
| 32.2 | 67.6 | 0.2 | 90 | 90 | 90 | 90 | 90 |
| 32.1 | 67.4 | 0.5 | 70 | 80 | 85 | 90 | 90 |
| 29.1 | 60.9 | 10.0 | 50 | 65 | 75 | 85 | 90 |
| 27.8 | 57.6 | 14.6 | 50 | 60 | 70 | 80 | 85 |
| 26.6 | 54.0 | 21.4 | 40 | 50 | 60 | 70 | 80 |
| 19.2 | 42.3 | 38.5 | 20 | 30 | 35 | 35 | 35 |
| 15.8 | 40.3 | 43.9 | 0 | 0 | 0 | 5 | 5 |

TABLE 15

| (Weight ratio) | | | Generation efficiency on lapse of time (%) | | | | |
|---|---|---|---|---|---|---|---|
| (A) Component carbonate | (B) Component acid | Hydrophobic material | 24h | 48h | 72h | 96h | 120h |
| Magnesium carbonate | Fumaric acid | Polyethylene wax | | | | | |
| 36.5 | 63.5 | 0 | 65 | 65 | 65 | 65 | 65 |
| 36.4 | 63.4 | 0.2 | 60 | 60 | 60 | 60 | 60 |
| 36.4 | 63.3 | 0.4 | 60 | 60 | 60 | 60 | 60 |
| 36.3 | 63.2 | 0.5 | 40 | 50 | 60 | 65 | 65 |
| 35.9 | 62.5 | 1.6 | 30 | 40 | 50 | 60 | 65 |
| 27.3 | 47.5 | 25.2 | 20 | 35 | 45 | 55 | 65 |
| 22.6 | 39.4 | 38.0 | 10 | 20 | 30 | 30 | 30 |
| 21.2 | 36.8 | 42.0 | 0 | 0 | 0 | 5 | 5 |
| Calcium carbonate | Burnt alum | Stearic acid | | | | | |
| 16.1 | 83.1 | 0.8 | 25 | 50 | 65 | 75 | 80 |
| Calcium carbonate | Boric acid | Stearic acid | | | | | |
| 59.9 | 37.1 | 3.0 | 0 | 0 | 0 | 0 | 0 |

Experimental Example 12

A component carbonate or component acid and a hydrophobic material were mixed together with heating (60° C. to 140° C.) by stirring at a high speed to obtain a component coated with the hydrophobic material. Generating compositions were each prepared using a combination of different kinds coated components thus prepared. The same procedure as in Experimental Example 10 was thereafter repeated with the results given in Tables 16.

compositions of the invention are manifestly adapted for continued generation for a long period of time.

Experimental Example 13

The carbon dioxide gas generating compositions listed in Table 17 below were placed in an environment of 30° C. and 80% RH, and checked for the duration of gas generation. The compositions were prepared in the same manner as in Experimental Example 10. Table 17 also shows the results.

TABLE 16

| (Weight ratio) | | Ratio of (B) based on (A) | (Weight ratio) | | Ratio of (B) based on (A) | Fumaric acid | Generation efficiency on lapse of time (%) | | |
|---|---|---|---|---|---|---|---|---|---|
| (A) | (B) | (%) | (A) | (B) | (%) | (Weight ratio) | 24 h | 72 h | 120 h |
| 17.8 | 0 | 0 | 17.8 | 2.7 | 15.0 | 61.7 | 25 | 50 | 65 |
| 18.0 | 0.1 | 0.7 | 18.0 | 0.1 | 0.7 | 63.8 | 30 | 45 | 65 |
| 16.9 | 0.8 | 4.7 | 16.7 | 6.5 | 38.9 | 59.0 | 20 | 40 | 65 |
| 16.6 | 2.5 | 15.1 | 17.0 | 6.2 | 36.5 | 57.7 | 15 | 40 | 65 |

Note
(A): Calcium carbonate
(B): Stearic acid

Experimental Examples 11 and 12 reveal that conventional compositions attain a generation efficiency of 90% 24 hours later and encounter extreme difficulty in producing gas continuously for a prolonged period of time, whereas the

TABLE 17

| Component carbonate | Component acid | Hydrophobic material | Generation efficiency on lapse of time (%) | | |
|---|---|---|---|---|---|
| | | | 24 h | 72 h | 120 h |
| Calcium carbonate | Citric acid | Beeswax | | | |
| 32.3 | 67.7 | 0 | 60 | 60 | 60 |
| 32.2 | 67.6 | 0.2 | 60 | 60 | 60 |
| 32.1 | 67.4 | 0.5 | 40 | 55 | 60 |
| 31.8 | 66.6 | 1.6 | 35 | 50 | 60 |
| 27.8 | 57.6 | 14.6 | 35 | 45 | 60 |
| 26.6 | 54.0 | 21.4 | 20 | 35 | 50 |
| 19.2 | 42.3 | 38.5 | 15 | 25 | 25 |
| 15.8 | 40.3 | 43.9 | 0 | 0 | 0 |
| | Fumaric acid | Stearic acid | | | |
| 36.5 | 63.5 | 0 | 25 | 25 | 25 |
| 36.4 | 63.4 | 0.2 | 25 | 25 | 25 |
| 36.3 | 63.2 | 0.5 | 15 | 20 | 25 |
| 34.6 | 60.2 | 5.2 | 15 | 20 | 25 |
| 31.0 | 53.8 | 15.2 | 5 | 20 | 25 |
| 24.6 | 42.7 | 32.7 | 5 | 10 | 20 |
| 21.2 | 36.8 | 42.0 | 0 | 0 | 0 |

Experimental Example 14

The same procedure as in Experimental Example 13 was repeated with the exception of using the carbon dioxide gas generating compositions listed in Tables 18-1, 18-2, 18-3 and 19. The compositions were prepared in the same manner as in Experimental Example 12. The results are shown also in Tables 18-1, 18-2, 18-3 and 19.

TABLE 18-1

| (Weight ratio) | | Ratio of (B) based on (A) | (Weight ratio) | | Ratio of (B) based on (A) | Fumaric acid | Generation efficiency on lapse of time (%) | | |
|---|---|---|---|---|---|---|---|---|---|
| (A) | (B) | (%) | (A) | (B) | (%) | (Weight ratio) | 24 h | 72 h | 120 h |
| 17.8 | 0 | 0 | 17.8 | 2.7 | 15.2 | 61.8 | 15 | 20 | 25 |
| 16.9 | 0.8 | 4.7 | 18.0 | 6.0 | 33.3 | 58.3 | 10 | 15 | 25 |
| 16.6 | 2.5 | 15.1 | 17.0 | 6.4 | 37.6 | 57.5 | 10 | 15 | 25 |

Note
(A): Calcium carbonate
(B): Stearic acid

TABLE 18-2

| (Weight ratio) | | Ratio of (B) based on (A) | (Weight ratio) | | Ratio of (B) based on (A) | (C) (Weight ratio) | Equivalent ratio | Generation efficiency on lapse of time (%) | | |
|---|---|---|---|---|---|---|---|---|---|---|
| (A) | (B) | (%) | (A) | (B) | (%) | | (A):(C) | 24 h | 72 h | 120 h |
| 19.8 | 0 | 0 | 17.5 | 2.7 | 15.4 | 60.0 | 1:2.3 | 40 | 60 | 75 |
| 20.0 | 0.1 | 0.5 | 19.9 | 0.2 | 1.0 | 59.8 | 1:2.2 | 50 | 70 | 80 |
| 17.2 | 3.0 | 17.4 | 18.7 | 6.6 | 35.3 | 54.5 | 1:2.2 | 20 | 35 | 55 |

Note
(A): Sodium hydrogencarbonate
(B): Lauric acid
(C): Fumaric acid

TABLE 18-3

| (Weight ratio) | | Ratio of (B) based on (A) | (Weight ratio) | | Ratio of (B) based on (A) | (C) (Weight | Equivalent ratio | Generation efficiency on lapse of time (%) | | |
|---|---|---|---|---|---|---|---|---|---|---|
| (A) | (B) | (%) | (A) | (B) | (%) | ratio) | (C):(A) | 24 h | 72 h | 120 h |
| 29.0 | 0 | 0 | 30.0 | 1.0 | 3.3 | 40.0 | 1:2.1 | 55 | 70 | 85 |
| 29.6 | 0.2 | 0.7 | 30.0 | 0.4 | 1.3 | 39.8 | 1:2.2 | 50 | 70 | 90 |
| 25.8 | 4.1 | 15.9 | 26.8 | 5.8 | 21.6 | 37.5 | 1:2.0 | 25 | 40 | 60 |

Note
(A): Fumaric acid
(B): Sodium palmitate
(C): Sodium hydrogencarbonate

TABLE 19

| (Weight ratio) | | | | | | Generation efficiency on lapse of time (%) | | |
|---|---|---|---|---|---|---|---|---|
| Calcium carbonate | Stearic acid | Calcium carbonate | Palmitic acid | Fumaric acid | Sucrose | 24 h | 72 h | 120 h |
| 13.3 | 0 | 13.3 | 2.0 | 46.4 | 25.0 | 30 | 45 | 65 |
| 12.7 | 0.6 | 12.7 | 5.0 | 44.0 | 25.0 | 20 | 45 | 65 |
| 12.4 | 2.0 | 13.0 | 4.0 | 43.6 | 25.0 | 20 | 40 | 65 |

Experimental Example 15

The same procedure as in Experimental Example 13 was repeated with the exception of using the generating compositions prepared in the same manner as in Experimental Example 11. Tables 20 and 21 show the results.

TABLE 20

| (Weight ratio) | | | | Generation efficiency on lapse of time (%) | | |
|---|---|---|---|---|---|---|
| Calcium carbonate | Fumaric acid | Lauric acid | Sucrose | 24 h | 72 h | 120 h |
| 27.4 | 47.6 | — | 25.0 | 60 | 60 | 60 |
| 41.9 | 51.7 | 1.4 | 5.0 | 30 | 50 | 60 |
| 18.0 | 37.4 | 19.6 | 25.0 | 20 | 45 | 65 |
| 12.0 | 25.5 | 27.5 | 35.0 | 10 | 30 | 50 |

TABLE 21

| (Weight ratio) | | | Hydrophobic material | Generation efficiency on lapse of time (%) | | |
|---|---|---|---|---|---|---|
| Component carbonate | Component acid | | | 24 h | 72 h | 120 h |
| Calcium carbonate 27.0 | — | Fumaric acid 31.3 | Citric acid 37.7 | Stearic acid 4.0 | 25 | 45 | 65 |
| Calcium carbonate 20.0 | Sodium hydrogen-carbonate 7.4 | — | Succinic acid 68.6 | Stearic acid 4.0 | 30 | 50 | 70 |

Experimental Example 16

Carbon dioxide gas generating compositions were each prepared by adding a specified amount stearic acid serving as a hydrophobic material to a mixture of sodium hydrogencarbonate and fumaric acid in an equivalent ratio of 1:1. The compositions were placed in an environment having a temperature of 30° C. and relative humidity of 90%, and checked for reaction efficiency with time. The results are given in Table 22.

TABLE 22

| Weight ratio | | | Generation efficiency on lapse of time (%) | | | | State of composition | Note |
|---|---|---|---|---|---|---|---|---|
| Component carbonate | Component acid | Hydrophobic material | 24 h | 48 h | 72 h | 120 h | | |
| Sodium hydrogencarbonate | Fumaric acid | Stearic acid | | | | | | |
| 59.2 | 40.8 | 0.0 | 85 | 95 | 100 | 100 | ○ | *1 |
| 59.0 | 40.8 | 0.2 | 85 | 95 | 100 | 100 | ○ | *1 |
| 58.9 | 40.6 | 0.5 | 70 | 80 | 90 | 100 | ○ | *1 |
| 56.2 | 38.8 | 5.0 | 60 | 70 | 80 | 90 | ○ | *1 |
| 46.7 | 32.3 | 21.0 | 40 | 50 | 60 | 70 | ○ | *1 |
| 35.8 | 24.7 | 39.5 | 10 | 25 | 35 | 45 | ○ | *1 |
| 26.6 | 18.4 | 45.0 | 5 | 5 | 5 | 5 | ○ | *2 |

Note
*1: Invention
*2: Comp. Ex.

The state of the generating compositions in Table 22 is evaluated according to the same criteria as in Table 2.

Experimental Example 17

A pack of each of the carbon dioxide gas generating compositions listed in Tables 23 and 24 below and packed with a nonwoven fabric and 3 kg of broccoli were placed into a case of 0201-type (JIS-Z-1507) film-laminated corrugated paperboard which had a 30-μm-thick low-density polyethylene film incorporated in each of top and bottom liners thereof between liner layers by lamination. The case was sealed with a tape in an I-form and stored at 25° C. for 3 days. The case was then checked for the concentration of carbon dioxide gas within, and the state of the broccoli and the reaction efficiency of the composition were estimated when the case was opened. Tables 23 and 24 also show the results. The value in the parentheses is an equivalent ratio. The interior of the case was at least 95% in RH.

TABLE 23

| Composition | Mixing ratio | Reaction efficiency | Carbon dioxide concentration (%) | | | | Evaluation |
|---|---|---|---|---|---|---|---|
| | | | 6 h | 24 h | 48 h | 72 h | |
| Sodium hydrogencarbonate (1) | 49.2 | 100 | 20.5 | 16.0 | 15.1 | 13.9 | Good quality with greenness preserved well |
| Fumaric acid (1.5) | 50.8 | | | | | | |
| Sodium hydrogencarbonate (1) | 48.7 | 90 | 14.6 | 15.9 | 15.2 | 14.3 | Good quality with greenness preserved well |
| Succinic acid (1.5) | 51.3 | | | | | | |
| Sodium hydrogencarbonate (1) | 53.5 | 80 | 20.0 | 21.0 | 16.9 | 13.8 | Good quality with greenness preserved well |
| Fumaric acid coated with 5% stearic acid (1.2) | 46.5 | | | | | | |

TABLE 24

| Composition | Mixing ratio | Reaction efficiency | Carbon dioxide concentration (%) | | | | Evaluation |
|---|---|---|---|---|---|---|---|
| | | | 6 h | 24 h | 48 h | 72 h | |
| Calcium carbonated (1) | 32.7 | 100 | 20.3 | 16.5 | 14.8 | 14.0 | Good quality with greenness preserved well |
| Fumaric acid (1.4) | 53.7 | | | | | | |
| Potassium carbonate | 13.6 | | | | | | |
| Calcium carbonate (1.1) | 25.3 | 90 | 14.6 | 17.8 | 15.5 | 15.2 | Good quality with |

TABLE 24-continued

| Composition | Mixing ratio | Reaction efficiency | Carbon dioxide concentration (%) | | | | Evaluation |
|---|---|---|---|---|---|---|---|
| | | | 6 h | 24 h | 48 h | 72 h | |
| Fumaric acid (1) | 26.7 | | | | | | greenness preserved well |
| Sodium hydrogencarbonate | 25.8 | | | | | | |
| Citric acid | 22.2 | | | | | | |

Experimental Example 18

Broccoli (3 kg) and a packet of 350 g of each of the carbon dioxide gas generating compositions listed in Tables 25 and 26 below and packed with a nonwoven fabric were placed into a bag of 30-μm-thick low-density polyethylene (LDPE) film formed with perforations of 0.1 mm in diameter at 25° C., the opening end of the bag was tied up, and the carbon dioxide generation efficiency was measured with time. Tables 25 and 26 also show the result.

TABLE 25

| Composition | Proportion of component (wt. %) | Generation efficiency on lapse of time (%) | | | Carbon dioxide concentration (%) | | | Quality on lapse of 72 h |
|---|---|---|---|---|---|---|---|---|
| | | 24 h | 48 h | 72 h | 24 h | 48 h | 72 h | |
| Fumaric acid | 63.5 | | | | | | | |
| Untreated calcium carbonate | 36.5 | 50 | 55 | 60 | 9 | 5 | 4 | Slightly yellowed but acceptable |
| Kieselguhr inpregnated with oxalic acid and coated with 0.3% gelatin | 85.0 | | | | | | | |
| Calcium carbonate coated with 03% gelatin | 15.0 | 80 | 80 | 80 | 10 | 1 | 1 | Quality impaired with marked yellowing |
| Fumaric acid | 62.0 | | | | | | | |
| Untreated calcium carbonate | 37.6 | | | | | | | |
| Stearic acid | 0.4 | 30 | 50 | 65 | 10 | 9 | 7 | Good quality with greenness preserved well |

TABLE 26

| Composition | Proportion of component (wt. %) | Generation efficiency on lapse of time (%) | | | Carbon dixoide concentration (%) | | | Quality on lapse of 72 h |
|---|---|---|---|---|---|---|---|---|
| | | 24 h | 48 h | 72 h | 24 h | 48 h | 72 h | |
| Fumaric acid | 61.8 | | | | | | | |
| Untreated calcium carbonate | 17.8 | | | | | | | |
| Calcium carbonate coated with 15% stearic acid | 20.4 | 30 | 55 | 65 | 11 | 10 | 9 | Good quality with greenness preserved well |
| Fumaric acid | 58.7 | | | | | | | |
| Calcium carbonate coated with 5% stearic acid | 17.7 | | | | | | | |
| Calcium carbonate coated with 40% stearic acid | 23.6 | 15 | 35 | 62 | 12 | 11 | 11 | Good quality with greenness preserved well |
| Oxalic acid | 80.0 | | | | | | | |
| Calcium carbonate coated with 0.3% gelatin | 20.0 | 90 | 90 | 90 | 12 | 3 | 1 | Quality impaired with marked yellowing |
| Kieselguhr impregnated with oxalic acid and coated with 0.3% gelatin | 85.0 | | | | | | | |
| Calcium carbonate | 15.0 | 80 | 80 | 80 | 9 | 1 | 1 | Quality impaired with marked yellowing |

Experimental Example 19

In the same manner as in Experimental Example 17, 3 kg of ginggengcai and a packet of each of the carbon dioxide gas generating compositions listed in Table 27 below and packed with a nonwoven fabric were placed into a case of 0201-type (JIS-Z-1507) film-laminated corrugated board, and the case was sealed with a tape in an I-form and stored at 25° C. for 3 days. The case was then checked for the concentration of carbon dioxide gas within, and the state of the vegetable and the reaction efficiency of the composition were estimated when the case was opened. Table 27 also shows the results. The value in the parentheses is an equivalent ratio the interior of the case was at least 95% in RH.

TABLE 27

| Composition | Mixing ratio | Reaction efficiency | Carbon dioxide concentration (%) | | | | Evaluation |
|---|---|---|---|---|---|---|---|
| | | | 6 h | 24 h | 48 h | 72 h | |
| Sodium hydrogencarbonate(1) | 49.2 | | | | | | Good quality with |
| Fumaric acid(1.5) | 50.8 | 100 | 19.5 | 17.5 | 15.2 | 14.5 | greenness preserved well |
| Sodium hydrogencarbonate(1) | 37.9 | | | | | | Good quality with |
| Succinic acid(1.5) | 62.5 | 90 | 15.5 | 18.5 | 16.7 | 16.1 | greenness preserved well |
| Calcium carbonate(1) | 32.7 | | | | | | |
| Fumaric acid(1.4) | 53.7 | 100 | 19.7 | 19.1 | 17.2 | 15.3 | Good quality with |
| Potassium carbonate | 13.6 | | | | | | greenness preserved well |
| Magnesium carbonate(1) | 29.6 | | | | | | |
| Succinic acid(1.4) | 58.1 | 90 | 16.4 | 18.0 | 17.0 | 15.5 | Good quality with |
| Sodium carbonate | 12.3 | | | | | | greenness preserved well |

Experimental Example 20

In the same manner as in Experimental Example 17, 3 kg of small welsh onion simply wrapped with a biaxially oriented polypropylene film and a packet of each of the carbon dioxide gas generating compositions listed in Table 28 below and packed with a nonwoven fabric were placed into a case of 0201-type (JIS-Z-1507) film laminated corrugated board, and the case was sealed with a tape in an I-form and stored at 25° C. for 3 days. The case was then checked for the concentration of carbon dioxide gas within, and the state of the small welsh onion, and the reaction efficiency of the composition were estimated when the case was opened. Table 28 also shows the results. The value in the parentheses is an equivalent ratio. The interior of the case was about 70% in RH.

TABLE 28

| Composition | Mixing ratio | Reaction efficiency | Carbon dioxide concentration (%) | | | | Evaluation |
|---|---|---|---|---|---|---|---|
| | | | 6 h | 24 h | 48 h | 72 h | |
| Sodium carbonate monohydrate(1) | 28.7 | | | | | | |
| Fumaric acid(2.2) | 57.5 | | | | | | Good quality with |
| Isomerized sugar | 13.8 | 80 | 14.0 | 14.5 | 13.5 | 12.9 | greenness preserved well |
| Calcium carbonate(1) | 29.2 | | | | | | |
| Succinic acid(1.5) | 51.7 | | | | | | Good quality with |
| Potassium carbonate | 19.1 | 80 | 14.8 | 14.3 | 12.5 | 11.0 | greenness preserved well |

Experimental Example 21

The generating compositions shown in Table 29 were inserted into oriented polyethylenetelephatalate film bag having a thickness of 40 μm and sealed. The composition were checked for storage stability at 20° C., relative humidity of 65%. Equivalent ratio of component carbonate and component acid was 1:1.

TABLE 29

| Component carbonate | Component acid | Other component | Storage stability Just after experiment | After 15 days | After 30 days | Note |
|---|---|---|---|---|---|---|
| Sodium hydrogen-carbonate 59.2 | Fumaric acid 40.8 | — | o | o | o | *1 |
| 49.7 | Burnt alum 50.3 | — | o | o | o | *1 |
| 58.7 | Succinic acid 41.3 | — | o | o | o | *1 |
| 56.0 | Glutalic acid 44.0 | — | o | o | Δ | *1 |
| 47.0 | Succininc acid 33.0 | Calcium chloride 20.0 | X | X | X | *2 |

Note
*1: Invention
*2: Comp. Ex.
o: No gas is produced. Stability is good.
Δ: Gas is hardly produced. Stability is almost good.
X: Gas is produced. Stability is no good.

EXAMPLES

Examples are given below wherein the parts are by weight.

Example 1

To 17.8 parts of calcium carbonate was added 2.7 parts of stearic acid, and the mixture was heated to 120° C., stirred at 2000 r.p.m. for 15 minutes and withdrawn from the reaction vessel at room temperature. To the mixture were further added 17.8 parts of calcium carbonate and 61.7 parts of fumaric acid, and the resulting mixture was thoroughly stirred to prepare a carbon dioxide gas generating composition. When treated in the same manner as in Experimental Example 11, the composition produced the same effect as the generating compositions of Experimental Example 12, according to the invention.

Example 2

To 36.3 parts of magnesium carbonate and 63.2 parts of fumaric acid was added 0.5 part of polyethylene wax, and the mixture was thoroughly stirred to prepare a carbon dioxide gas generating composition. The composition was comparable to those of Experimental Example 11 in effect.

Example 3

Calcium carbonate (12.7 parts) and 0.6 part of stearic acid were heated to 120° C. and stirred at 2000 r.p.m. for 20 minutes. On the other hand, 12.7 parts of calcium carbonate and 5.0 parts of palmitic acid were heated to 100° C. and stirred at 2000 r.p.m. for 10 minutes. The two mixtures were mixed together, and 44 parts of fumaric acid and 25 parts of sucrose were further added to the resulting mixture to prepare a carbon dioxide gas generating composition. The composition was comparable to those of Experimental Example 14 in effect.

What is claimed is:

1. A carbon dioxide gas generating composition characterize in that:
   (a) the composition comprises the combination of at least one component acid greater than carbonic acid in dissociation constant, at least 0.5 g/100 g water in solubility at 30° C. and solid (at least 40° C. in melting point) at room temperature and at least one component alkali carbonate up to 50 g/100 g water in solubility at 30° C.,
   (b) at least one of the component acid and the component alkali carbonate of the combination is an acid having a solubility of up to 90 g/100 g water at 30° C. or an alkali carbonate having a solubility of up to 2 g/100 g water at 30° C.,
   (c) the component acid is an acid or a salt convertible into an acid on decomposition, and the component alkali carbonate is an alkali metal carbonate or hydrogencarbonate, or alkaline earth metal carbonate, and,
   (d) the ratio of the component acid to the component alkali carbonate to be mixed therewith is 1:5 to 5:1 in equivalent ratio.

2. A carbon dioxide gas generating composition as defined in claim 1 which is characterized in that the component alkali carbonate serving as a main component comprises a carbonate and/or a hydrogencarbonate up to 2 g/100 g water in solubility at 30° C., the composition having further incorporated therein an alkaline metal carbonate and/or hydrogencarbonate having a solubility at 30° C. of higher than 10 g/100 g water to not higher than 130 g/100 g water in an amount of 5 to 40 weight %.

3. A carbon dioxide gas generating composition as defined in claim 1 or 2 which is characterized in that the component acid serves as a main component and is an acid up to 90 g/100 g water in solubility at 30° C., the composition having further incorporated therein at least one of an acid at least 150 g/100 g water in solubility at 30° C. and solid (at least 40° C. in melting point) at room temperature, a salt thereof and a salt convertible into an acid on decomposition and at least 150 g/100 g water in solubility at 30° C.

4. A carbon dioxide gas generating composition as defined in any one of claims 1 or 2 which has further incorporated therein 0.1 to 40 wt. % of at least one of a wax, fatty acid having at least 6 carbon atoms, salt of the fatty acid and ester of the fatty acid as a hydrophobic material.

* * * * *